July 4, 1967  P. N. ARMSTRONG  3,329,938
MULTIPLE-BIT BINARY RECORD SORTING SYSTEM
Filed Feb. 24, 1964  3 Sheets-Sheet 1
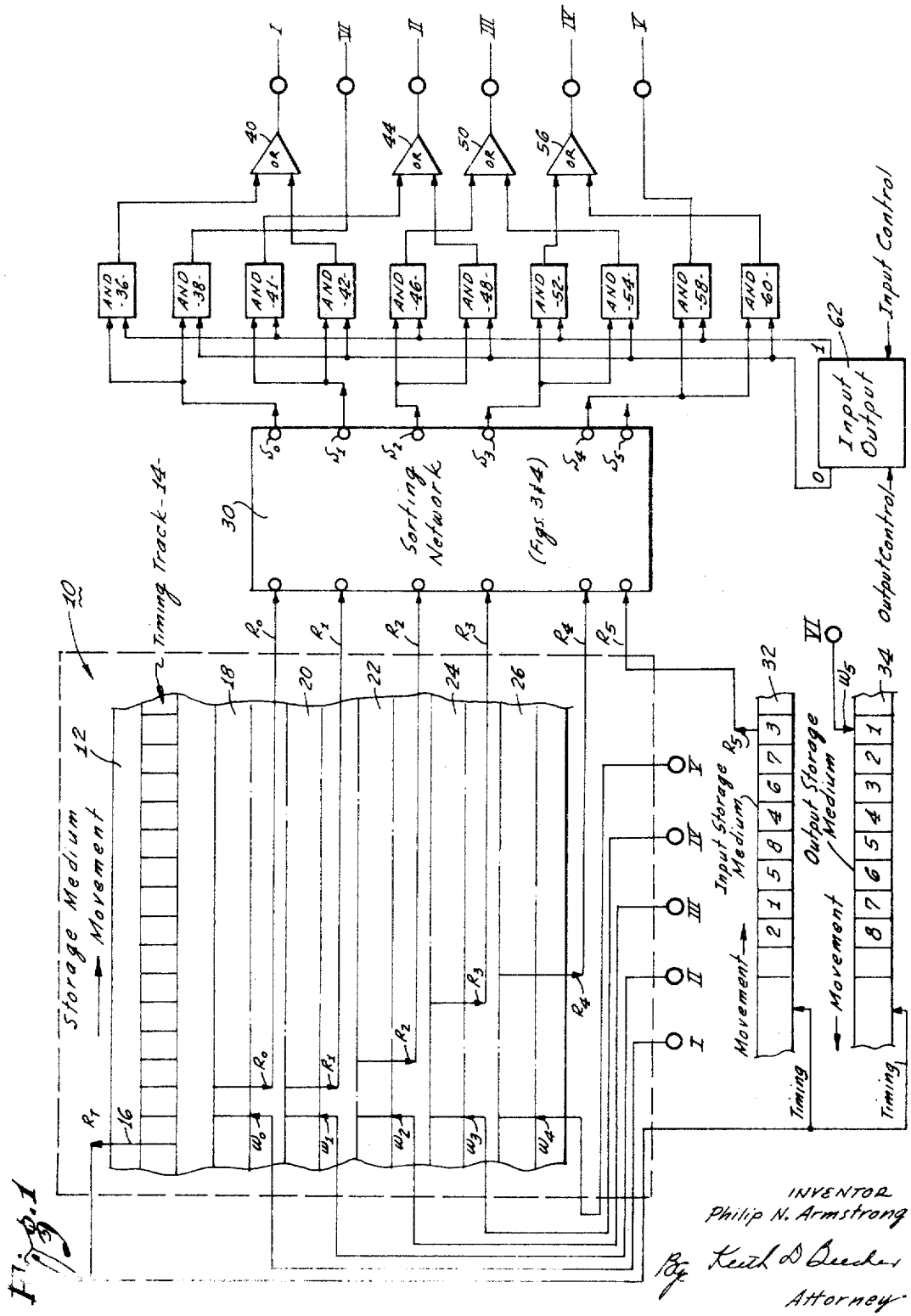
INVENTOR
Philip N. Armstrong
By Keith D. Beecher
Attorney July 4, 1967  P. N. ARMSTRONG  3,329,938
MULTIPLE-BIT BINARY RECORD SORTING SYSTEM
Filed Feb. 24, 1964  3 Sheets-Sheet 2

Fig. 2a (Load)

| I $R_0$ | II $R_1$ | III $R_2$ | IV $R_3$ | $R_0 R_1 R_2 R_3 R_S$ | Sort I II III IV V |
|---|---|---|---|---|---|
| 0 | 0 | 0 0 | 0 0 0 0 | 0,0,0,0,3 | 3,0,0,0,0 |
| 3 | 0 | 0 0 | 0 0 0 0 | 3,0,0,0,7 | 7,3,0,0,0 |
| 7 | 3 | 0 0 | 0 0 0 0 | 7,3,0,0,6 | 7,6,3,0,0 |
| 7 | 6 | 3 0 | 0 0 0 0 | 7,6,0,0,4 | 7,6,4,0,0 |
| 7 | 6 | 4 3 | 0 0 0 0 | 7,6,3,0,8 | 8,7,6,3,0 |
| 8 | 7 | 6 4 | 3 0 0 0 | 8,7,4,0,5 | 8,7,5,4,0 |
| 8 | 7 | 5 6 | 4 3 0 0 | 8,7,6,0,1 | 8,7,6,1,0 |
| 8 | 7 | 6 5 | 1 4 3 0 | 8,7,5,0,2 | 8,7,5,2,0 |
| 8 | 7 | 5 6 | 2 1 4 3 | | |

Fig. 2b (Unload)

| VI ← Movement | I $R_0$ | II $R_1$ | III $R_2$ | IV $R_3$ | $R_0 R_1 R_2 R_3$ | Sort VI, I, II, III |
|---|---|---|---|---|---|---|
| 0 0 0 0 0 0 0 | 8 | 7 | 5 6 | 2 1 4 3 | 8,7,6,3 | 8,7,6,3 |
| 0 0 0 0 0 0 8 | 7 | 6 | 3 5 | 0 2 1 4 | 7,6,5,4 | 7,6,5,4 |
| 0 0 0 0 0 8 7 | 6 | 5 | 4 3 | 0 0 2 1 | 6,5,3,1 | 6,5,3,1 |
| 0 0 0 0 8 7 6 | 5 | 3 | 1 4 | 0 0 0 2 | 5,3,4,2 | 5,4,3,2 |
| 0 0 0 8 7 6 5 | 4 | 3 | 2 1 | 0 0 0 0 | 4,3,1,0 | 4,3,1,0 |
| 0 0 8 7 6 5 4 | 3 | 1 | 0 2 | 0 0 0 0 | 3,1,2,0 | 3,2,1,0 |
| 0 8 7 6 5 4 3 | 2 | 1 | 0 0 | 0 0 0 0 | 2,1,0,0 | 2,1,0,0 |
| 8 7 6 5 4 3 2 | 1 | 0 | 0 0 | 0 0 0 0 | 1,0,0,0 | 1,0,0,0 |
| 8 7 6 5 4 3 2 1 | 0 | 0 | 0 0 | 0 0 0 0 | | |

INVENTOR:
Philip N. Armstrong
By Keith D. Beecher
Attorney

July 4, 1967   P. N. ARMSTRONG   3,329,938
MULTIPLE-BIT BINARY RECORD SORTING SYSTEM
Filed Feb. 24, 1964   3 Sheets-Sheet 3

(Sorting Network)

INVENTOR.
Philip N. Armstrong
By Keith D. Beecher
Attorney

United States Patent Office

3,329,938
Patented July 4, 1967

3,329,938
MULTIPLE-BIT BINARY RECORD SORTING
SYSTEM
Philip N. Armstrong, 17331 Keegan Way,
Santa Ana, Calif. 92705
Filed Feb. 24, 1964, Ser. No. 347,650
5 Claims. (Cl. 340—172.5)

The present invention relates to data processing and data handling apparatus and systems, and it relates more particularly to an improved sorting system which is capable of re-arranging multi-digit binary data representative of a plurality of randomly positioned records and of presenting the data in a sorted sequence.

This application is a continuation-in-part of copending application Ser. No. 208,007, filed July 6, 1962 and now abandoned.

It is well known in the art of data processing and data handling that sorting of the data and records is of prime importance. Such sorting, for example, facilitates the reference to any particular item in a large file of data; and it also enables several files of information to be collated with one another.

It is usual in the art to store different items of data in the form of record words composed of multi-digit binary signals. These words are stored, for example, on an appropriate medium, such as a magnetic tape. In such a system it is usual for each record word to include a control, or address, field which bears binary digital data identifying the particular word.

The particular embodiment of the invention to be described responds to such record words and senses the respective control fields thereof to perform a sorting operation. The system of the invention serves to re-arrange the records and to present the same in a particular sequence, as designated by their corresponding control fields.

An important object of the present invention, therefore is to provide an improved system which is capable of performing sorting operations, such as described above, in a rapid and efficient manner, and with the minimum of storage requirements.

Another object is to provide such an improved sorting system which is rapid and efficient in its operation, and which is capable of sorting a large or small number of records with equal facility so as to be flexible in its applications.

As mentioned above, data sorting is a basic and important process in the data processing and data handling art. The sorting process, moreover, has long presented a serious problem to the art in the provision of a system and equipment capable of performing sorting operations at high speed, and without the requirement of excessively large storage facilities and excessively complicated control circuitry and other extraneous components.

In the past, the emphasis has been on devising appropriate sorting routines for use in existing mechanisms and apparatus. However, the present invention is predicated upon a unique and improved sorting concept, which concept is practiced by a structural combination and system which is unlike the existing prior art types of data processors, and associated apparatus.

The usual prior art sorting techniques require, for the most part, excessively large storage capabilities. These storage capabilities usually, in the prior art sorting systems, must be several times larger than required to hold the data to be sorted. One important feature of the present invention is that the storage requirements of the storage system do not exceed the normal storage required to hold the data itself.

A storing system requiring such minimum storage capabilities is described, for example, in Patent 3,015,089, which issued Dec. 26, 1961, in the name of the present inventor. The system of the present invention is similar in general nature and in some respects to the system described in the aforesaid patent. However, the system of the present invention is predicated upon a different operating principle, so that it is capable of achieving the sorting operation with fewer structural components and more rapidly than the system described in the patent.

The embodiment of the invention to be described, like the system described in the aforesaid patent, includes a plurality of storage elements constituted, for example, by different tracks on a storage member and associated read and write transducer heads. The storage elements are capable of individually storing different numbers of record words. For example, two of the storage elements can store but one record word each, one of the storage elements can store two record blocks, one of the storage elements can store four record blocks, and so on. Sufficient storage of this general type is provided to accommodate the number of record words to be sorted, and no additional storage is required.

It is to be understood, however, that the present invention is not limited to any particular size, arrangement, order or sequence of the storage elements referred to above.

It will be appreciated that the storage medium for the storage elements described in the preceding paragraphs may be provided by the usual type of magnetic memory drum, or magnetic tape, or by any other appropriate memory medium.

In the operation of the system of the invention, the record words to be sorted are introduced serially into the sorting system; these words, of course, being randomly positioned as they are so fed into the system.

The sorting operation commences the moment the first rocord is introduced into the system, and that record is placed in one of the single-word storage elements to remain there until it is displaced by a subsequent record of, for example, a higher number control field. Then, as subsequent records are fed serially into the sorting system of the invention, the corresponding fields thereof are compared with the control fields of certain ones of the records already in the system, so that an initial partial sort has already been performed at the end of the input operation.

When all the record words are fed into the sorting system of the invention, so that the input operation is completed, the system is switched from its input mode to its output mode. Then, the record words are fed serially out of the system, during which a final sort comparison of their control fields is made. The operation is such that the sorting process is completed for any particular record, as that word is fed out of the system, and the result is that the records fed out of the system appear in a particular predetermined sequence, as determined by their control fields.

The entire sorting operation of the system of the invention is carried out, therefore, in the time required to feed the randomly arranged records into the system, plus the time required to feed the records serially out of the system. No additional sort time is required while the records are in the sorting system. In addition, there is no requirement for any extra storage space, except that required to receive the different record words.

The input process of the sorting system of the invention may be terminated after any desired number of records have been introduced to the system, and the resulting output operation provides the records in the desired sequence. That is, there is no need for the sorting system of the invention to be filled with any particular number of records for a sorting operation on the records in the system to be carried out.

Other objects, advantages and features of the invention will become apparent from a consideration of the following description, when taken in conjunction with the accompanying drawings, in which:

FIGURE 1 is a schematic block diagram of a system representative of one embodiment of the present invention;

FIGURES 2A and 2B are tables representing schematically the manner in which the sorting operation of the system of the invention may proceed;

Figure 3:
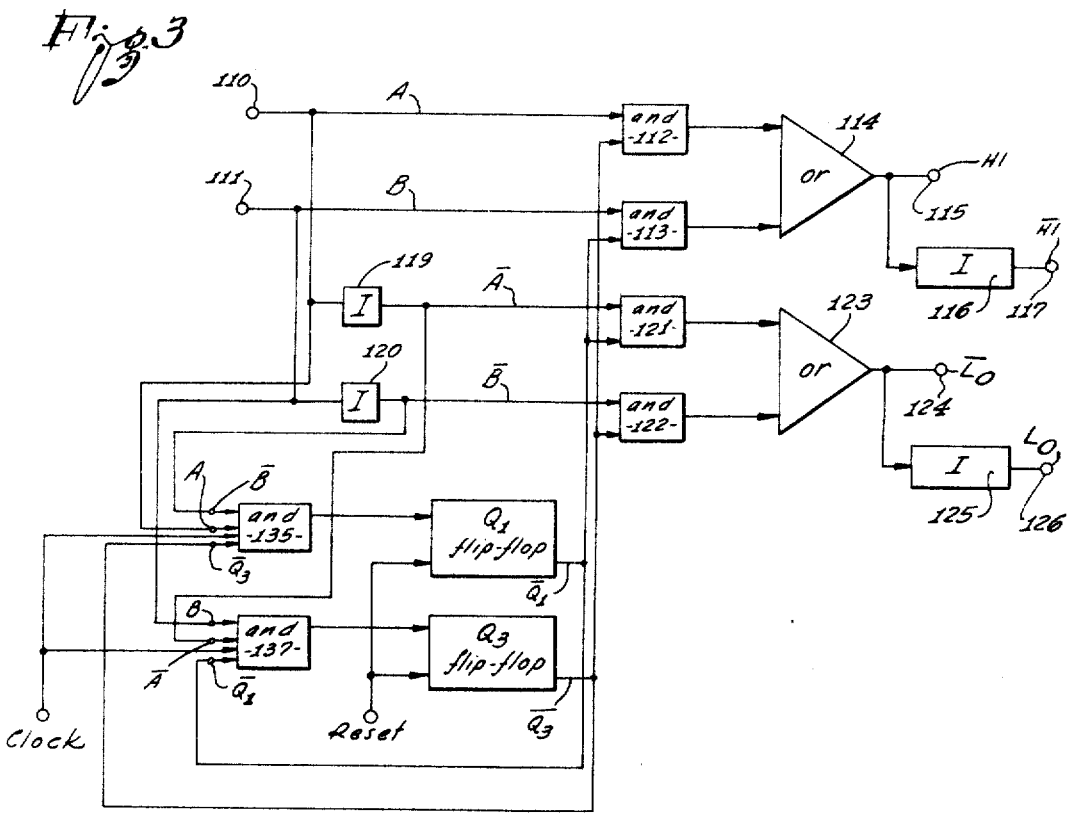
FIGURE 3 is a logic diagram of a sorting unit which may be used in the system of the invention.

The sorting system illustrated in FIGURE 1 includes a storage section 10. This storage section may include, for example, a magnetic memory drum, or memory tape, on which different tracks or channels are provided to constitute registers, or storage devices, for words of record data which are fed into the system for sorting purposes. Each record word includes a data portion and a control field. The data is contained in the data portion in the form of a multi-bit binary signal. A multi-bit identifying binary key signal is contained in the control field.

For example, the storage section 10 may include a storage medium in the form of a magnetic tape 12, of which a fragment is illustrated for purposes of simplicity. The magnetic tape 12 includes, for example, a first track or channel 14. The channel 14 may include regularly spaced magnetic recordings which, in turn, represent the beginning of each record word introduced into the system.

An appropriate read head 16 is positioned adjacent the channel 14 in magnetically coupled relationship therewith. The read head 16 is indicated by an arrow, and it may be constructed in any known and usual manner. The read head responds to the recordings in the channel 14 to provide electrical signals representative of the times of occurrence of each successive record word in the system.

The magnetic medium 12 includes a further track or channel 18, and this track forms a first storage device for the system. A write head of any suitable construction, and designated by the arrow $w_0$, is magnetically coupled to the track 18, and this head serves to record information in the track 18 in response to signals applied to an input terminal designated I, and which is connected to the write head. A read head $R_0$ is also associated with the track 18, and the read head is spaced from the write head $w_0$ by a distance corresponding to one record word.

In like manner, a track 20 is provided on the medium 12, and an appropriate write head $w_1$ and an appropriate read head $R_1$ are associated with the latter track. The write head $w_1$ responds to electrical signals applied to the input terminal II to record corresponding magnetic signals in the track 20. The read head $R_1$ is spaced a distance corresponding to one record word from the write head, and the read head responds to the magnetic recordings to reproduce the same into electrical signals.

The tracks 18 and 20, and their associated read-write transducer heads, therefore, constitute first and second storage elements for the record words fed into the system, with each of the storage elements being capable of holding one record word.

The record medium 12 also includes a track or channel 22. The latter channel has a write head $w_2$ and a read head $R_2$ associated therewith. The latter write and read heads are displaced from one another along the track 22 a distance corresponding to two record words. The write head $w_2$ responds to input signals introduced to the input terminal III to produce corresponding recordings in the track 22. The read head $R_2$ responds to the recordings in the track 22 to restore the same to electrical signals.

The record medium 12 also includes a track or channel 24. The latter channel has a write head $w_3$ magnetically coupled to it, and it also has a read head $R_3$ coupled to it. The write head $w_3$ and the read head $R_3$ are spaced from one another along the channel 24 a distance corresponding to four record words.

In like manner, the record medium 12 includes a further track or channel 26, the latter channel having a write head $w_4$ and a read head $R_4$. The latter write and read heads are spaced from one another a distance corresponding to five record words.

The write head $w_3$ responds to signals introduced thereto by way of an input terminal IV, and the write head $w_4$ responds to signals introduced thereto by way of an input terminal V.

It will be appreciated that more or less tracks may be provided on the record medium 12, depending upon the number of record words to be sorted by the system of the invention. It is also to be understood that the invention is not limited to any particular size or sequence of the storage devices formed by the different tracks, and their associated read and write heads.

The read heads $R_0$, $R_1$, $R_2$, $R_3$ and $R_4$ are connected to correspondingly indicated input terminals of a sorting network 30. The sorting network 30 may have any appropriate configuration, and a suitable form for the network will be described in conjunction with FIGURES 3 and 4. The sorting network responds to the aforementioned key binary signals in the control fields of the record words introduced to it, to sort the record field in an ascending or descending sequence of the key signals in the control fields, whichever is desired.

The input record words which are to be sorted by the system of the invention may be stored in a suitable input device, and in a random manner on any appropriate storage medium 32. This medium may, for example, be a magnetic tape. A suitable read head, designated $R_5$, is associated with the input device, and this head serves to convert the information thereon into corresponding electrical binary signals. The read head $R_5$ is connected to an input $R_5$ terminal of the sorting network 30.

As mentioned above, each record word consists, for example, of multi-digit binary numbers, and each word includes a control field. The control field is formed, for example, of a multi-digit binary key number, as noted, and it serves to identify the corresponding word. The sorting network 30 responds to the binary number of the control field of each word read into the sorting network through the read head $R_5$, and it compares the control field with the control fields of certain ones of the words already in the system, as will be described.

The different numbers illustrated on the storage medium 32 represent, for example, the decimal equivalents of the numbers represented by different ones of the control fields of the different record words. These particular decimal equivalents are illustrated merely to simplify the description of the invention.

The reading of the information on the medium 32 in the input device must be synchronized with the reading of the information from the storage section 10. For that reason, timing signals are derived from the word timing track 14, and these signals are used in usual way to synchronize the operation of the input device. The timing signals from the read head 16 associated with the timing track 14 are also used to control the operation of a corresponding output device, as illustrated by the arrows in FIGURE 1, and for the same reason.

As will become evident, the sorting network 30 normally has six output terminals corresponding to the six input terminals. However, only five of the output terminals of the sorting network are used in the illustrated system. These output terminals are designated $S_0$–$S_4$.

The output terminal $S_0$ of the sorting network 30 is connected to a pair of "and" gates 36 and 38. These "and" gates may be of the type well known to the electronic computer and data processor art. These gates, as is well understood, respond to a plurality of logical input terms to cause its output term to be logical "1," only when all the input terms are logical "1." The "and" gate 36 is connected to an "or" gate 40 which, in turn, is connected to an output terminal designated I. This output terminal connects back to the similarly designated input terminal described above.

The "or" gate 40 is of the type which is also well known to the electronic computer and data processing art. This gate, for example, produces a logical output which is logical "1," when any of its input terms are logical "1."

The "and" gate 38 is connected to an output terminal designated VI. This output terminal VI is connected to a similarly designated input terminal in an output storage medium 34, such as a magnetic tape mechanism. The output storage medium 34, as described above, is controlled by the word timing signals from the read head 16 of the storage section 10.

A write head $w_5$ is associated with the output storage medium 34, and this write head responds to the signals received by the input terminal VI to record corresponding signals on the storage medium. The resulting record words are recorded on the output storage medium 34 in a sorted sequence, as will be described, and these words are identified in FIGURE 1 by the decimal equivalents, for example, of their key signals in their respective control fields.

The output terminal $S_1$ of the sorting network 30 is connected to an "and" gate 41 and to an "and" gate 42. The "and" gate 41 is connected to an "or" gate 44, and the "and" gate 42 is connected back to the "or" gate 40. The "or" gate 44 is connected to an output terminal designated II. This output terminal is connected back to the similarly identified input terminal in the storage section 10.

The output terminal $S_2$ of the sorting network is connected to an "and" gate 46 and to an "and" gate 48. The "and" gate 46 is connected to an "or" gate 50, and the "and" gate 48 is connected back to the "or" gate 44. The "or" gate 50 is connected to an output terminal designated III. This output terminal is connected back to a similarly identified input terminal in the storage section 10.

The output terminal $S_3$ of the sorting network is connected to an "and" gate 52 and to an "and" gate 54. The "and" gate 52 is connected to an "or" gate 56, and the "and" gate 54 is connected back to the "or" gate 50. The "or" gate 56 is connected to an output terminal designated IV. The output terminal IV is connected to the similarly identified input terminal in the storage section 10.

The output terminal $S_4$ of the sorting network 30 is connected to an "and" gate 58 and to an "and" gate 60. The "and" gate 58 is connected to an output terminal designated V. This output terminal is connected to the similarly identified input terminal in the storage section 10. The "and" gate 60 is connected back to the "or" gate 56.

The sorting system of FIGURE 1 also includes an input-output flip-flop designated 62. A first output terminal, designated 0 of the flip-flop 62 is connected to each of the "and" gates 38, 42, 48, 54 and 60. A second output terminal designated 1 of the flip-flop 62 is connected to each of the "and" gates 36, 41, 46, 52 and 58.

The input-output flip-flop 62 controls the operating mode of the sorting system of FIGURE 1. The flip-flop responds to an appropriate input control signal applied to one of its input terminals, to be set to a first stable state. When the flip-flop 62 is in its first stable state, the sorting system is conditioned to an input mode, during which the "and" gates 36, 41, 46, 52 and 58 are enabled. During the input operating mode, the sorting system of the invention receives record words serially from the storage medium 32 of the input device, which words pass through the sorting network 30 to be stored in the storage section 10, as will be described.

The input-output flip-flop 62 can be set to its second stable state by a control signal applied to a second input terminal of the flip-flop. When the flip-flop is in its second state, the sorting system of the invention is conditioned to its output mode of operation, during which the "and" gates 38, 42, 48, 54 and 60 are enabled.

It will be appreciated that when the flip-flop 62 is set to condition the sorting system to its input mode, the output terminals $S_0$, $S_1$, $S_2$, $S_3$ and $S_4$ of the sorting network are respectively connected to respective ones of the output terminals I, II, III, IV and V. On the other hand, when the system is set to its output mode of operation, the output terminals $S_0$, $S_1$, $S_2$, $S_3$, $S_4$ of the sorting network are respectively connected to the output terminals VI, I, II, III and IV.

The sorting network 30, as will be described, responds to the key signals in the control fields of the different record words applied to its input terminals $R_0$–$R_5$ to sort the different record blocks on the basis of their different control fields, and to produce the blocks in a particular sequence at the different output terminals $S_0$–$S_4$.

For purposes of the present description, for example, it will be assumed that the input storage medium 32 initially loads binary "0's" into the sorting system, so that the binary numbers of the control fields of the input record blocks are initially compared with binary "0's." It will also be assumed that the sorting network 30 responds to such a comparison to produce the record word with the maximum control field number at the terminal $S_0$, and those with decreasing control field numbers at the terminals $S_1$, $S_2$, $S_3$ and $S_4$, respectively.

Consider now a typical input operation, during which eight record words having key signals in their control fields representing the illustrated numbers in the input storage medium 32, for purposes of explanation, are input into the system.

The first record word 3 applied to the input terminal $R_5$ of the sorting network is greater than the zeros in the system, so that the record word appears at the output terminal $S_0$ of the sorting network to be written into the track 18 of the storage section 10 by way of the output and input terminals I, and by way of the write head $w_0$.

During the next reading interval, the record word 3 is read by the read head $R_0$ and applied to the sorting network 30, at the same time the new record block 7 is applied to the sorting network by way of the read head $R_5$ and associated input terminal of the sorting network. Then, and as represented by the table of FIGURE 2A, the record word 7 appears at the terminal $S_0$ of the sorting network 30 and the record block 3 appears at the terminal $S_1$. Therefore, this latter reading results in the word 7 being placed in the track 18 and the word 3 being placed in the track 20.

In like manner, and as shown in FIGURE 2A, the next reading interval results in the word 7 being placed in the track 18, the word 6 being placed in the track 20, and the word 3 being placed in the track 22. Likewise, the next reading interval results in the word 7 being placed in the track 18, the word 6 being placed in the track 20, and the word 4 being placed in the track 22, together with the word 3.

Successive readings of the record words in the input storage medium 32, causes the record words to be distributed into the sorting system in the manner shown in FIGURE 2A. It will be appreciated that during this input, or loading operation, each record word read into the system is compared with at least some of the record words previously read into the system, so that a preliminary sort of the record words is achieved, as the information is being read into the sorting system.

At the completion of the input, or load, operation of the system, the words read into the sorting system from the input device assume the positions illustrated by the last line of the table of FIGURE 2A, this line representing the actual position of the different record words in the storage section 10 of the sorting system at the completion of the input operation.

If the information is permitted to recirculate through the sorting system, each succeeding pass results in a rearrangement of the information in the different tracks, but does not result in any further transfer of record words from one track to another.

Immediately upon the information being loaded into the sorting system of FIGURE 1, as described above, the flip-flop 62 may be then set to its output state, so that the information may be read from the sorting system in serial manner into the output device. As shown in FIGURE 2B, the arrangement is such that the information read from the $S_0$ terminal of the sorting network 30 is applied to the output device by way of the output and input terminals VI.

The first word to be read into the output device is the block 8. Then, during the next reading interval, the record word 7 is presented at the output terminal $S_0$ of the sorting network 30 for appliaction to the output device. Likewise, for each subsequent sensing interval, the record words applied by the storage section 10 to the sorting network 30 occur in such a sequence that the next greatest record word is applied to the sorting network to appear at the output terminal $S_0$ for application to the output device. The result, therefore, at the termination of the output information is for all the record words to appear in the output storage medium 34, and in the proper sequence as determined by the key signal numbers represented by their control fields.

It will be appreciated, therefore, that the storage section 10 of the sorting system need provide no additional storage capabilities, other than those rquired to receive the maximum number of record blocks to be sorted. Also, it will be appreciated that the sorting is carried out in a simplified manner upon the serial reading of the record words into the sorting system and then out of the system, and without any requirement for additional sort times. It should also be evident, that although the sorting of the system particularly described proceeded on a decreasing sequence basis, that the system may be easily adapted to operate on an increasing sequence basis, if so desired.

The sorting network of FIGURE 3 is similar to the network disclosed in Patent 2,984,822 issued May 16, 1961, in the name of the present inventor. This network may be incorporated into each unit of the sorting system of FIGURE 4, which in turn, is suitable to form the sorting network 30 in FIGURE 1.

The sorting network of FIGURE 3 is constructed so that first and second multi-digit signals are respectively gated through first and second "and" gates and through a first "or" gate to a high or "Hi" output terminal; and complements of the first and second multidigit signals are respectively gated through third and fourth "and" gates and through a second "or" gate to a low or "Lo" output terminal.

The passage of the multi-digit binary signals through the "and" gates is controlled by a flip-flop $Q_1$ and by a flip-flop $Q_3$. As will be described, the flip-flop $Q_1$ controls the second and third "and" gates, and the flip-flop $Q_3$ controls the first and fourth "and" gates.

As described in Patent 2,984,822, and as will be described briefly herein, the first and second multi-digit binary signals pass through all the "and" gates so long as each successive bit thereof are either both "1" or both "0." Therefore, as long as this condition continues, the successive 1 bits and 0 bits appear at the "Hi" and "Lo" terminals.

However, when a condition occurs such that one of the bits of one of the input signals is a "0," when the corresponding bit of the other input signal is a "1," the sorting network is controlled so that thereafter all the bits of the former signal appear at the "Lo" output terminal and all the bits of the latter signal appear at the "Hi" output terminal.

It is apparent that if the two input signals are introduced to the sorting network with the most significant digit of each signal in the lead, the network will cause the greater signal to appear at the "Hi" output terminal and the lower signal to appear at the "Lo" output terminal.

The network of FIGURE 3 includes a first input terminal 110 which receives, for example, a first multi-bit binary signal; and the network also includes a second input terminal 111 which receives, for example, a second multi-digit binary signal which is to be compared with the first signal. The first signal applied to the input terminal 110 is designated A, and the second signal applied to the input terminal 111 is designated B. The complements of these signals are designated $\overline{A}$ and $\overline{B}$ respectively.

The input terminal 110 is connected to an "and" gate 112 and to an inverter network 119. The input terminal 111 is connected to an "and" gate 113 and to an inverter network 120. As well understood by the computer art, the inverter network 119 responds to the input signal A to produce its complement $\overline{A}$, and the inverter network 120 responds to the input signal B to produce its complement $\overline{B}$.

The inverter network 119 is connected to an "and" gate 121, and the inverter network 120 is connected to an "and" gate 122. The "and" gates 112 and 113 are connected to an "or" gate 114. The "or" gate 114 is connected to an output terminal 115, and through an inverter network 116 to an output terminal 117. The output terminal 115 is designated "Hi", and the output terminal 117 is designated "$\overline{Hi}$."

The "and" gates 121 and 122 are coupled to an "or" gate 123 which, in turn, is connected to an output terminal 124, and to an inverter network 125. The inverter network 125 is connected to an output terminal 126. The output terminal 124 is designated "$\overline{Lo}$" and the output terminal 126 is designated "Lo."

The input terminal 110 and the inverted network 120 are connected to an "and" gate 135. This means that the multi-digit signals A and $\overline{B}$ are introduced to the "and" gate 135. The input terminal 111 and the inverter network 119 are connected to an "and" gate 137. This means that the multi-digit input signals B and $\overline{A}$ are applied to the "and" gate 137. Appropriate clock pulses are also applied to the "and" gates 135 and 137.

The "and" gate 135 is connected to the set input terminal of a flip-flop $Q_1$ designated "inhibit flip-flop"; and the "and" gate 137 is connected to the set input terminal of a flip-flop $Q_3$, designated "exchange flip-flop." An appropriate reset input pulse is applied to the reset input terminals of the flip-flop $Q_1$ and $Q_3$ by way of an input terminal 134. The false output terminal of the flip-flop $Q_1$ is connected to the "and" gates 113 and 121, and back to the "and" gate 137. This terminal applies the term $\overline{Q_1}$ to these "and" gates. The flip-flop $Q_3$ has a false output terminal connected to the "and" gates 112 and 122, and back to the "and" gate 135. This latter output terminal applies the term $\overline{Q_3}$ to the "and" gates.

As noted above, in order for the network of FIGURE 3 to effect sorting, it is necessary for the input signal A and B to be arranged with their most significant digits first. This means that the control field of each record word must be sensed first, and the key signal in the control field must be read from its most significant to its least significant bit. At the commencement of a sorting operation, both the flip-flops $Q_1$ and $Q_3$ are reset, so that the terms $\overline{Q_1}$ and $\overline{Q_3}$ are both logical "1." This means that all the "and" gates 112, 113, 121 and 122 are conductive.

The two input signals to be sorted are introduced to the input terminals 110 and 111 respectively. These signals, as mentioned above, are designated A and B, and they are introduced to the input terminals with their most significant bits first.

So long as the corresponding bits of the two signals A and B are the same, that is, are either both "1", or both "0", the bits pass through the "and" gates to appear at both the output terminals 115 and 126, and to appear in complemented form at both the output terminals 117 and 124. Assume now that a bit of the signal A is a "0," at the time when the corresponding bit of the signal B is a "1," and that this is the first instance that such a condition has occurred. This means that the signal B is greater than the signal A. Also, under this condition, the term $\overline{A} \cdot B$ is true, so that the "and" gate 137 is enabled. The next clock pulse sets the flip-flop $Q_3$, so that the "and" gates 112 and 122 are rendered non-conductive. Also, the "and" gate 135 is rendered non-conductive, so that no further triggering of either of the flip-flops $Q_1$ or $Q_3$ is possible during the particular comparison operation.

Following the detection of a "0" bit in the A signal, as compared with a "1" bit in the B signal, indicating that the B signal is greater than the A signal, the remaining bits of the A signal are applied through the conductive "and" gate 121 in complemented ($\overline{A}$) form, and through the "or" gate 123 and inverter network 125 to the "Lo" output terminal 126. The corresponding bits of the greater B signal, however, are passed directly through the conductive "and" gate 113 and through the "or" gate 114 to the "Hi" output terminal 115.

Therefore, the detection of the above-described inequality between the A and B signals, causes the A signal to appear at the "Lo" output terminal (and its complement to appear at the "$\overline{Lo}$" terminal), and causes the B signal to appear at the "Hi" output terminal (and its complement to appear at the "$\overline{Hi}$" output terminal).

Conversely, should the comparison described above reach a point at which the A signal exhibits a "1" digit in correspondence with a "0" digit exhibited by the B signal, indicating that the A signal is greater than the B signal, the term $A \cdot \overline{B}$ applied to the "and" gate 135 enables the "and" gate, so that the next clock pulse sets the flip-flop $Q_1$. The setting of the flip-flop $Q_1$ causes the "and" gates 113 and 121 to become non-conductive, as well as the "and" gate 137. The fact that the "and" gate 137 is non-conductive prevents any setting of the flip-flop $Q_3$ during the remaining portion of the comparison process.

Under the latter set of conditions, the greater A signal is passed through the "and" gate 112 to the "Hi" output terminal 115, whereas the lesser B signal is passed through the inverter 120, and through the "and" gate 122 and "or" gate 123 to the inverter 125. The latter signal is re-inverted in the inverter 125 and appears at the "Lo" output terminal 126.

Therefore, in the manner described above, and as described in greater detail in the above-mentioned Patent 2,984,822, the network of FIGURE 3 responds to the multi-digit input signals applied to its input terminals to produce the signals in a manner such that the greater of the two appears at one of its output terminals, and the lesser of the two appears at the other of its output terminals.

Figure 4:
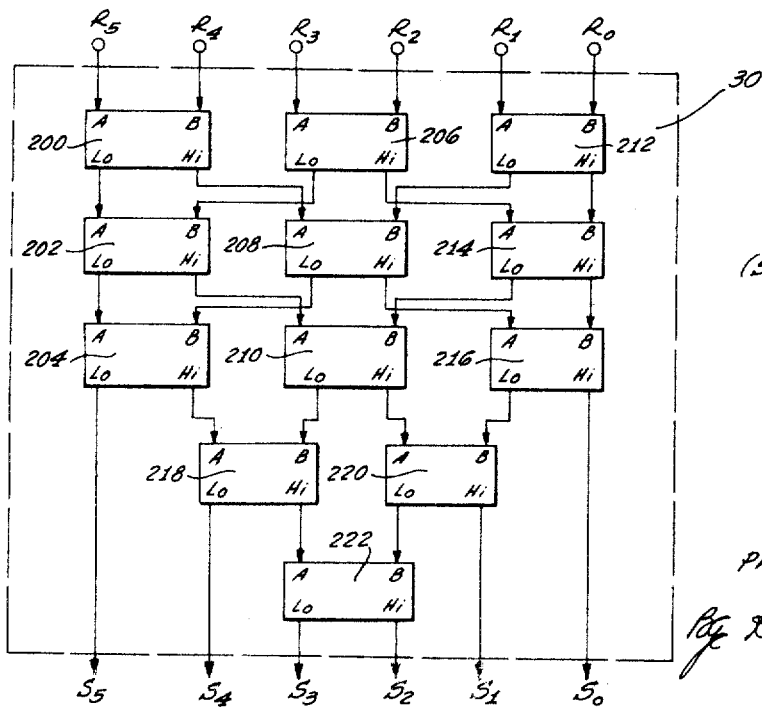
FIGURE 4 is a further representation of the manner in which a plurality of the units of FIGURE 3 may be inter-connected to form a sorting network for use in the system.

In a manner described in detail in the above-mentioned Patent 3,015,089, a plurality of sorter networks, such as described in FIGURE 3, are combined in a matrix arrangement in FIGURE 4. In the diagram of FIGURE 4 each rectangle is intended to represent a network, such as described in FIGURE 3.

As shown in FIGURE 4, a plurality of blocks 200, 202, 204, 206, 208, 210, 212, 214, 216, 218, 220 and 222 are enclosed in a rectangle 224. Each of these blocks, as mentioned above, corresponds to a sorter network, such as described in FIGURE 3. The input terminals to each of the blocks are designated A and B, and the output terminals are designated "Lo" and "Hi", to conform with the designation of the input and output terminals of the network of FIGURE 3.

In the illustrated embodiment, a pair of multi-bit binary input signals $R_5$ and $R_4$ are applied to the terminals A and B of the block 200, a pair of multi-bit binary input signals $R_3$ and $R_2$ are applied to the input terminals A and B of the block 206, and a pair of multi-bit input signals $R_1$ and $R_0$ are applied to the input terminals A and B of the block 212.

The output terminals of the blocks 200, 206 and 202 are connected to the input terminals of the blocks 202, 208 and 214 in a manner such that the lower of the two signals compared in the block 200 is introduced to the block 202, and the higher is introduced to the block 208; the lower of the signals compared in the block 206 is applied to the block 214; the lower of the two signals compared in the block 212 is applied to the block 208 and the higher is applied to the block 214.

Likewise, the lower of the signals compared in the block 202 is applied to the block 204, and the higher is applied to the block 210; the lower of the signals compared in the block 208 is applied to the block 204, and the higher is applied to the block 216; and the lower of the signals compared in the block 214 is applied to the block 210, and the higher is applied to the block 216.

Likewise, the lower of the two signals compared in the block 204 appears at an output terminal $S_5$ of the matrix, and the higher is applied to the block 218. The lower of the signals compared in the block 210 is also applied to the block 218, and the higher is applied to the block 220. The lower of the signals compared in the block 216 is applied to the block 220, and the higher appears at an output terminal $S_0$ of the matrix.

The high output signal from the block 216 is applied to the output terminal $S_0$, the high output signal from the block 220 is applied to the output terminal $S_1$, and the low output signal from the block 218 is applied to the output terminal $S_4$.

The low output signals from the block 220 is compared with the high output signal from the block 218, this comparison being carried out in the block 222. The high output signal from the block 222 is applied to the output terminal $S_2$, and the low output signal is applied to the output terminal $S_3$.

It will be appreciated, therefore, that the different input signals applied to the network in FIGURE 4 appear at the corresponding output terminals $S_5$–$S_0$, with the greatest signal appearing at the output terminal $S_0$, and so on in decreasing sequence at the terminals $S_1$, $S_2$, $S_3$ and $S_4$, respectively. Moreover, the network of FIGURE 4 can be adapted to handle a greater number of words per sort, merely by increasing the number of individual networks of FIGURE 3 in the overall network, and by correspondingly increasing the number of input and output terminals.

It will also be appreciated that the networks described in FIGURES 3 and 4 are suitable for use in the sorting network 30 of FIGURE 1. However, it is to be understood that these particular sorting networks are described merely by way of an example, and other appropriate networks may be used in the network 30. The purpose of the sorting network 30, as described above, is to respond to the inputs $R_0$–$R_5$ to provide corresponding outputs $S_0$–$S_4$ in a decreasing, or increasing, sequence.

In accordance with the concepts of the invention, therefore, the system of FIGURE 1 is first loaded with signals representative, for example, of "0," when it is desired for the sorting to proceed in accordance with the most significant control character first. Conversely, the system is loaded with binary "1's" at each bit position, when it is desired that the resulting output data characters will be sorted with the lowest control field number first.

In the illustrated embodiment, it is assumed that the system is initially loaded with binary "0's", and for the sorting to proceed with the most significant control field number first.

As described above, the system includes a plurality of storage devices of the circulating type which are arranged to store different numbers of record words, and which also are arranged to circulate the words stored in them through the sorting network 30. In the illustrated embodiment, the storage devices are arranged in groups capable of storing 1, 1, 2, 4, and 5 words resepctively. It will be understood, that the numbers of these devices can be extended, depending upon the number of words to be sorted in the system.

In the illustrated embodiment, the sorting system includes a first circulating type of storage device which is constructed to have a delay time corresponding to one word of data, and it also includes a plurality of additional recirculating storage devices; all arranged in a selected progression, insofar as their respective delay times are concerned.

That is, one possible progression includes a first and a second storage device each having a delay time corresponding to one word, a third storage device having a delay time corresponding to two words, a fourth storage device having a delay time corresponding to four words, a fifth storage device having a delay time corresponding to five words, a sixth storage device having a delay time corresponding to six words, a seventh device having a delay time corresponding to seven words, and so on. That is, the particular progression after the first 1-word storage device is 1, 2, 4, 4+1, 4+2, 4+3 . . . n.

This means that the storage capacity of the storage system need correspond only to the number of record words to be fed into it, and that no additional storage space is required. Also, and as mentioned above, the sorting process may be stopped at any time, and the sorting system will provide a sequence determined by the blocks already fed into the system.

As fully described above, upon the completion of the input operation, the sorting system is set to its output mode, and the information in the system is fed into the output device. During the output mode, a switching operation causes the greatest word for each sorting operation to be fed to the output device during a decreasing sequence sort, or the least block to be fed to the output device during an increased sequence sort. This results, as described above, in a regular sequence of blocks in the output device, as each successive sorting operation is carried out.

The invention provides, therefore, an improved and unique data handling system. The improved data handling system of the present invention is capable of rapidly and efficiently sorting blocks of data introduced into the system, and of producing the blocks in a predetermined ascending or descending sequence. As mentioned and fully described above, the system is advantageous in that the storage requirements are reduced to a minimum, and in that the entire sorting operation is carried out by an input operation followed by an output operation.

While a particular embodiment of the invention has been shown and described, modifications may be made, and it is intended in the claims to cover all such modifications as fall within the scope of the invention.

What is claimed is:

1. A data handling system including: a plurality of separate storage elements for storing a plurality of record words and each having an input and an output, a first of said storage elements having a capacity to provide storage for one of said words and the remaining ones of said storage elements having respective capacities to provide storage for predetermined different numbers of said words; input means for introducing record words to the system in a random arrangement; a network having input terminals respectively coupled to respective ones of said outputs of said storage elements and to said input means for receiving record words therefrom and having output terminals for presenting such words in a predetermined sequence across said output terminals; output means for receiving record words from the system in a predetermined sequence; and logic circuitry coupled to said output terminals of said network and to said output means and to respective ones of said inputs of said storage elements for circulating the record words presented by said network to predetermined respective ones of said storage elements and for applying the record words successively appearing in said first storage element to said output means in the predetermined sequence.

2. A data handling system including: a plurality of separate serial-type circulating storage elements for storing a plurality of equal length multi-bit binary signal record words and each having an input and an output, a first of said storage elements having a capacity to provide storage for one of said record words and for serially presenting the same during successive block times, and the remaining ones of said storage elements having respective capacities so as to produce a predetermined progression of said storage elements to provide storage for predetermined different numbers of said record words and for serially presenting the same at correspondingly different block times; input means for introducing equal length multi-bit binary signal record words to the system in a random sequence; a switching network having input terminals respectively coupled to respective ones of said storage elements and to said input means for receiving record words therefrom at successive word times and having output terminals for presenting such words in a predetermined sequence across said output terminals at each of a plurality of corresponding word times; output means for receiving record words from the system in a predetermined sequence; and logic circuitry coupled to said output terminals of said switching network and to said output means and to respective ones of said inputs of said storage elements for circulating the record words presented by said switching network back to predetermined respective ones of said storage elements in one operating condition of the system and for circulating the record words successively appearing in said first storage element to said output means and for circulating the other record words presented by said switching network back to other predetermined respective ones of said storage elements in a second operating condition of the system.

3. The data handling system of claim 2 in which said switching network includes a plurality of different input circuits respectively coupled to different ones of said storage elements and to said input means, in which said switching network includes a plurality of different output circuits at which different ones of the sequentially arranged record words appear, and in which said logic circuitry selectively couples said output circuits of said switching network to predetermined different ones of said storage elements.

4. The data handling system of claim 2 in which said predetermined progression of said storage elements is 1, 1, 2, 4, 4+1, 4+2, 4+3, . . . n.

5. The data handling system of claim 2 in which said switching network includes a plurality of different input circuits respectively coupled to different ones of said storage elements and to said input means, in which said switching network includes a plurality of different output circuits at which the different sequentially arranged record words appear, and in which said logic circuitry selectively couples said output circuit of said switching network to predetermined respective ones of said storage elements in one operating condition and to said output means and to other predetermined respective ones of said storage elements in a second operating condition.

References Cited

UNITED STATES PATENTS

| | | | |
|---|---|---|---|
| 2,674,733 | 4/1954 | Robbins | 340—172.5 |
| 2,955,280 | 10/1960 | Hughes | 340—172.5 |
| 3,013,249 | 12/1961 | Armstrong | 340—172.5 |
| 3,015,089 | 12/1961 | Armstrong | 340—172.5 |
| 3,029,413 | 4/1962 | O'Connor et al. | 340—172.5 |
| 3,034,102 | 5/1962 | Armstrong et al. | 340—172.5 |
| 3,034,103 | 5/1962 | Underwood | 340—172.5 |

ROBERT C. BAILEY, *Primary Examiner.*

J. P. VANDENBURG, *Assistant Examiner.*